(12) United States Patent
Boakye et al.

(10) Patent No.: US 11,780,780 B2
(45) Date of Patent: Oct. 10, 2023

(54) OXIDATION-RESISTANT FIBER COATINGS AND RELATED METHODS

(71) Applicant: Government of the United States as represented by the Secretary of the Air Force, Wright-Patterson AFB, OH (US)

(72) Inventors: Emmanuel E Boakye, Centerville, OH (US); Michael K Cinibulk, Beavercreek, OH (US); Randal S Hay, Beavercreek, OH (US); Pavel Mogilevsky, Beavercreek, OH (US); Triplicane A Parthasarathy, Beavercreek, OH (US); Kristin A Keller, Springboro, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 297 days.

(21) Appl. No.: 17/214,994

(22) Filed: Mar. 29, 2021

(65) Prior Publication Data

US 2021/0340067 A1    Nov. 4, 2021

Related U.S. Application Data

(63) Continuation-in-part of application No. 15/463,476, filed on Mar. 20, 2017, now abandoned.

(51) Int. Cl.
*C04B 35/628*  (2006.01)
*C04B 35/80*   (2006.01)
*C04B 35/626*  (2006.01)

(52) U.S. Cl.
CPC .. *C04B 35/62881* (2013.01); *C04B 35/62675* (2013.01); *C04B 35/80* (2013.01); *C04B 2235/5244* (2013.01)

(58) Field of Classification Search
CPC ................................. C04B 35/62881
See application file for complete search history.

(56) References Cited

U.S. PATENT DOCUMENTS 5,853,653 A  * 12/1998  Donato ............... C04B 35/571
                                                   264/642
2014/0255680 A1 *  9/2014  Lee ..................... C23C 28/042
                                                   428/312.6
(Continued)

FOREIGN PATENT DOCUMENTS

WO      2014199459      12/2013

OTHER PUBLICATIONS

Boakye et al., "Monazite Coatings on SiC fibers I: Fiber Strength and Thermal Stability," 2006, J. Am. Ceram. Soc. 89, pp. 3475-3480. (Year: 2006).*

(Continued)

*Primary Examiner* — Robert A Vetere
(74) *Attorney, Agent, or Firm* — AFMCLO/JAZ; Timothy M. Barlow

(57) ABSTRACT

A method of manufacturing a coated reinforcing fiber for use in Ceramic Matrix Composites, the method comprising pre-oxidizing a plurality of silicon-based fibers selected from the group consisting of silicon carbide (SiC) fibers, silicon nitride ($Si_3N_4$) fibers, SiCO fibers, SiCN fibers, SiCNO fibers, and SiBCN fibers at between 700 to 1300 degrees Celsius in an oxidizing atmosphere to form a silica surface layer on the plurality of silicon-based fibers, forming a plurality of pre-oxidized fibers; applying a rare earth orthophosphate ($REPO_4$) coating to the plurality of pre-oxidized fibers; and heating the plurality of $REPO_4$ coated pre-oxidized fibers at about 1000-1500 degrees Celsius in an inert atmosphere to react the $REPO_4$ with the silica surface layer to form a rare earth silicate or disilicate. The pre- (Continued)

oxidizing step may be 0.5 hours to about 100 hours. The heating step may be about 5 minutes to about 100 hours.

8 Claims, 11 Drawing Sheets

(56) References Cited

U.S. PATENT DOCUMENTS

2016/0348515 A1 12/2016 Varney et al.
2017/0341986 A1 11/2017 Hinoki et al.

OTHER PUBLICATIONS

Committee on Advanced Fibers for High-Temperature Ceramic Composites, Ceramic Fibers and Coatings, National Academy Press, 1998, Chapter 6.
Lee et al., Rare Earth Silicate Environmental Barrier Coatings for SiC/SiC Composites and Si3N4 Ceramics, Journal of The European Ceramic Society, Jan. 1, 2005, vol. 25 Issue: 10 pp. 1705-1715.
Cinibulk et al., High-Temperature Stability of Lanthanum Orthophosphate (Monazite) on Silicon Carbide at Low Oxygen Partial Pressures, Journal of the American Ceramic Society, 2008, 91 [7] 2290-2297.
Boakye et al., Monazite Coatings on SiC Fibers I: Fiber Strength and Thermal Stability, Journal of the American Ceramic Society, 2006, 89 [11] 3475-3480.
Boakye et al., Processing and Testing of RE2Si2O7 Fiber-Matrix Interphases for SiC—SiC Composites, Journal of the American Ceramic Society, 2015, 1-9.
WO2014199459 Nakane machine translation.
Boayke, E.E., et al., Two Phase Monazite/Xenotime 30LaPO4—70YPO4 Coating of Ceramic Fiber Tows, J. Am. Ceram. Soc., 91 (2008), pp. 17-25.

* cited by examiner

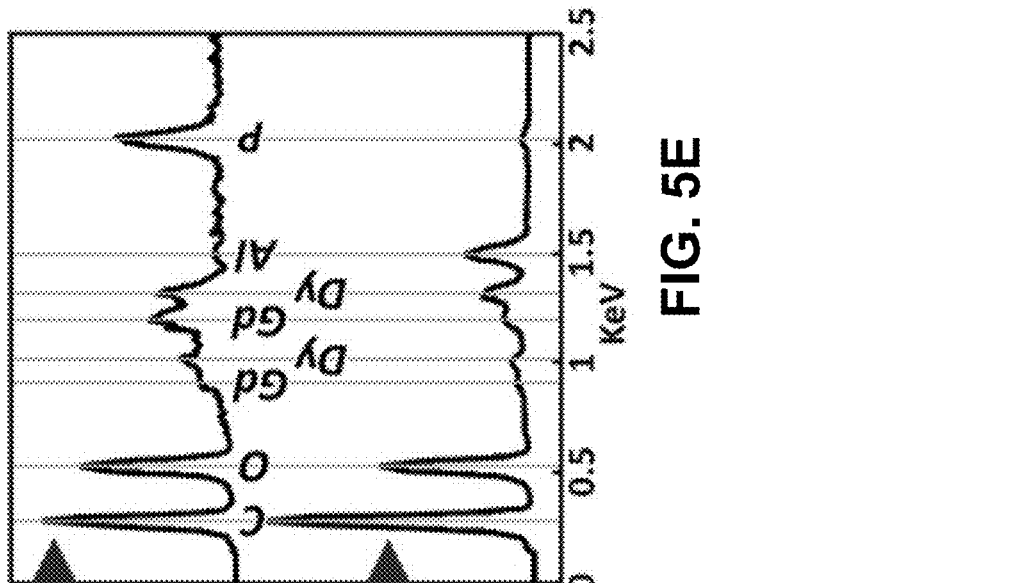
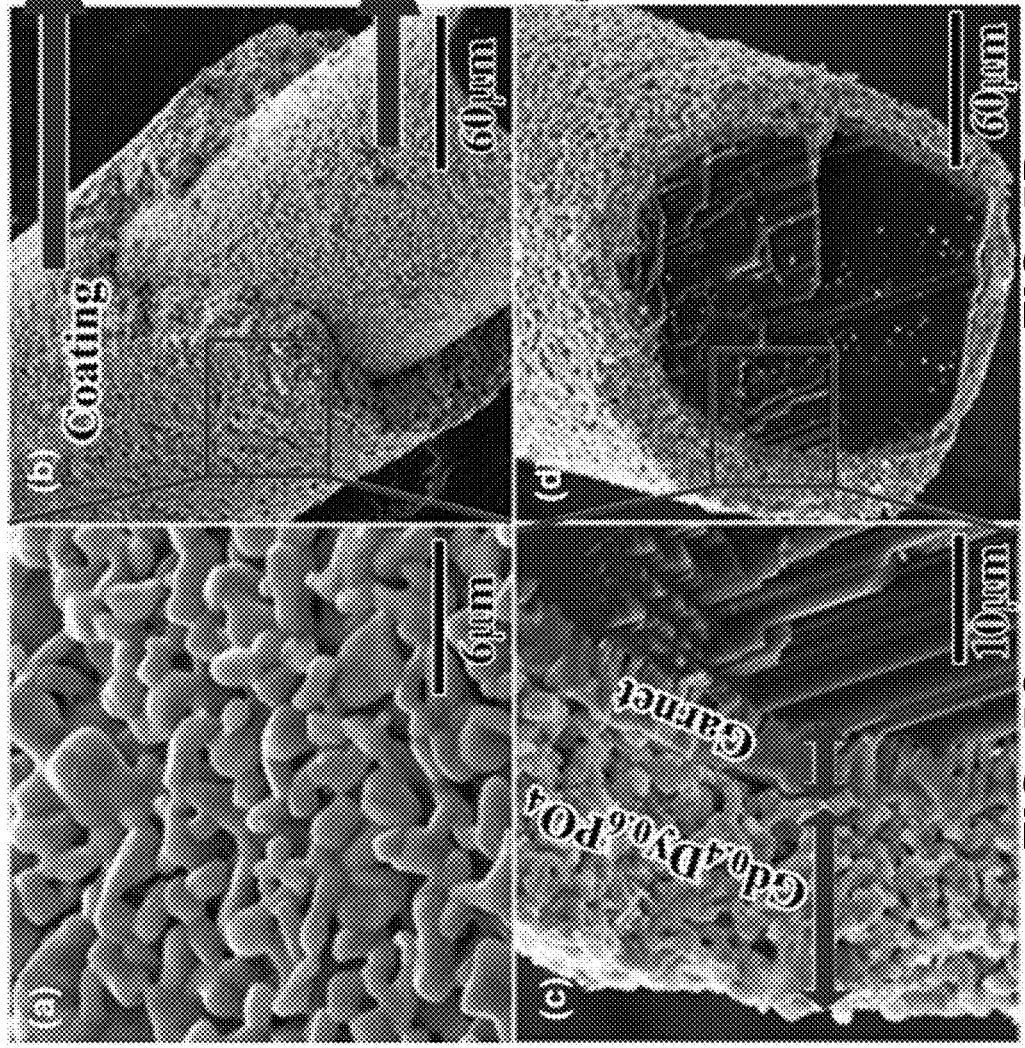

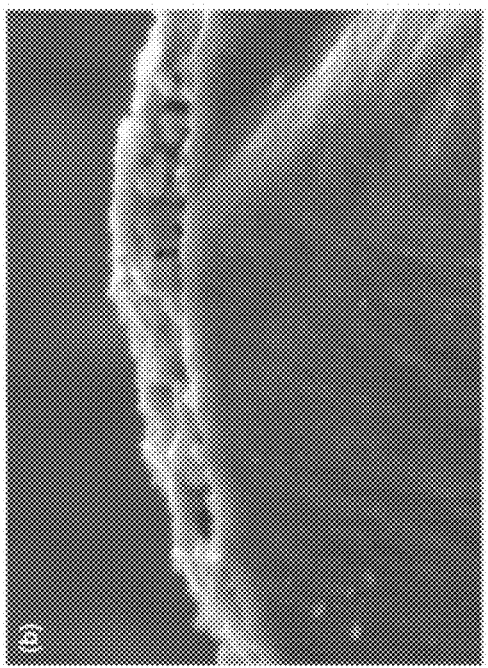
FIG. 7B
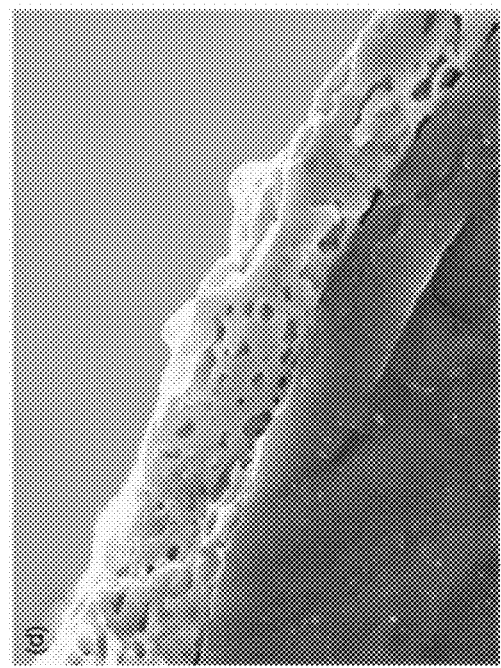
FIG. 7D  10μm
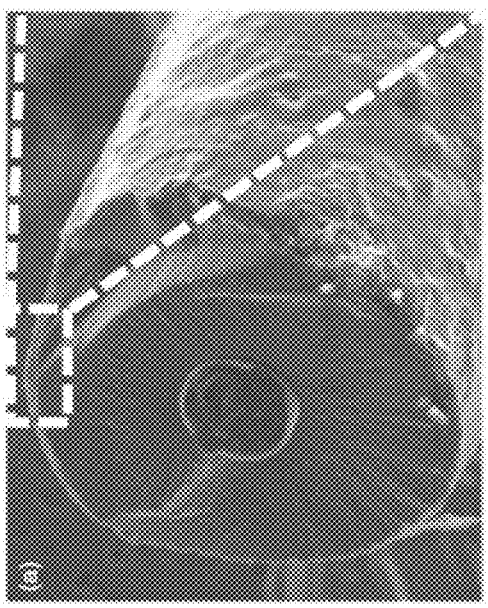
FIG. 7A
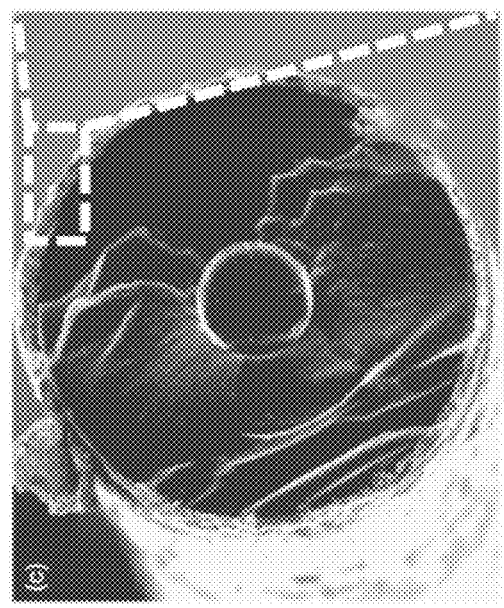
FIG. 7C  50μm

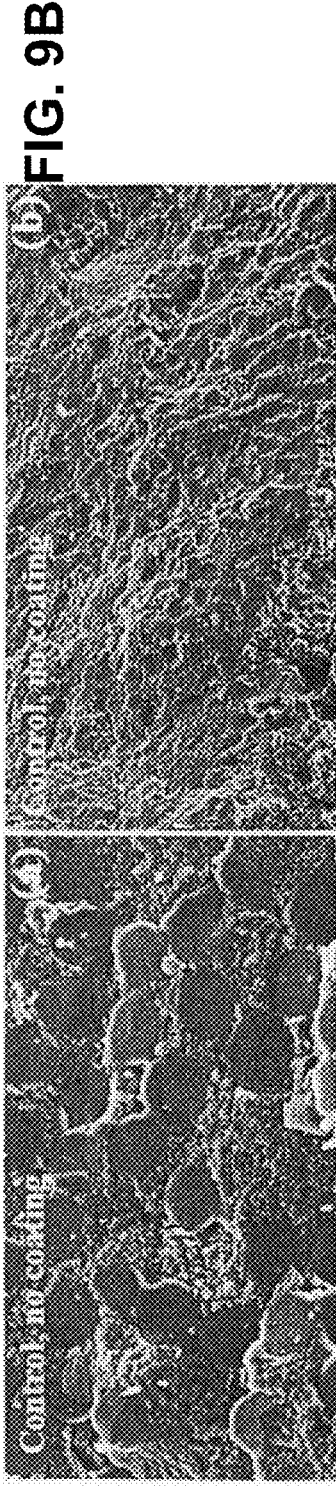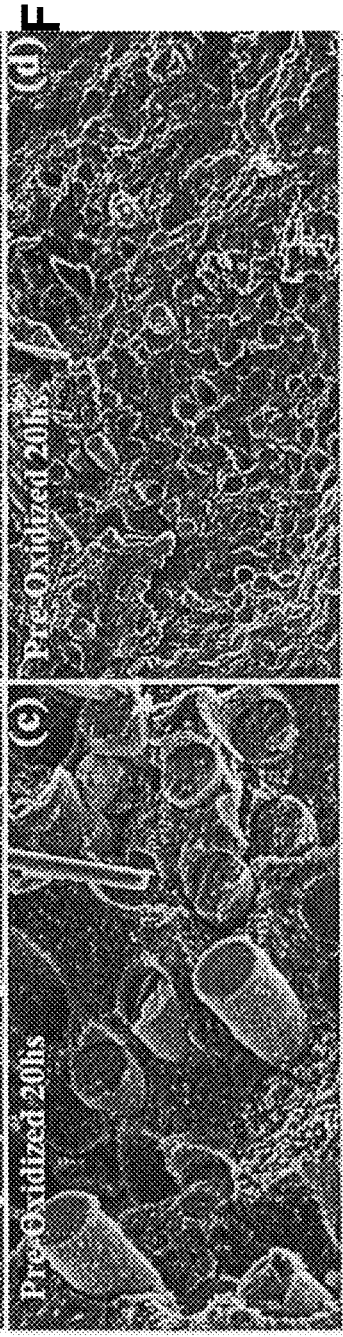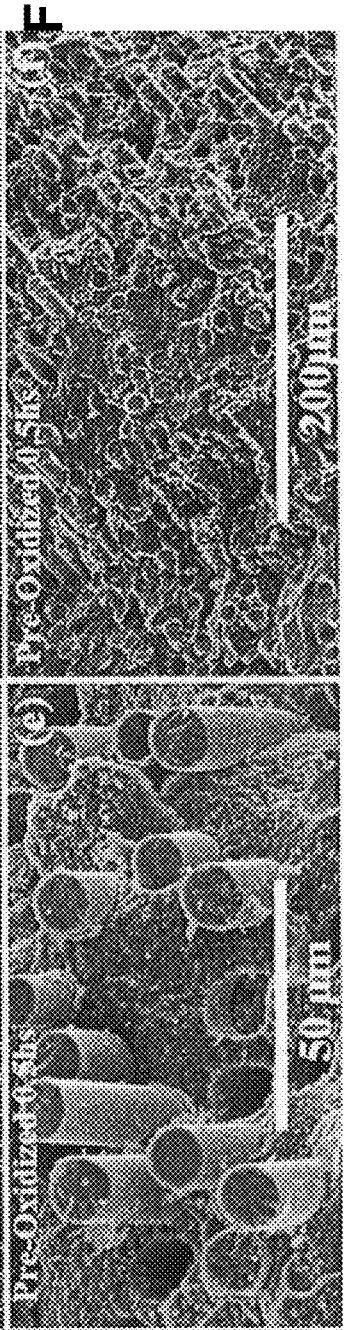

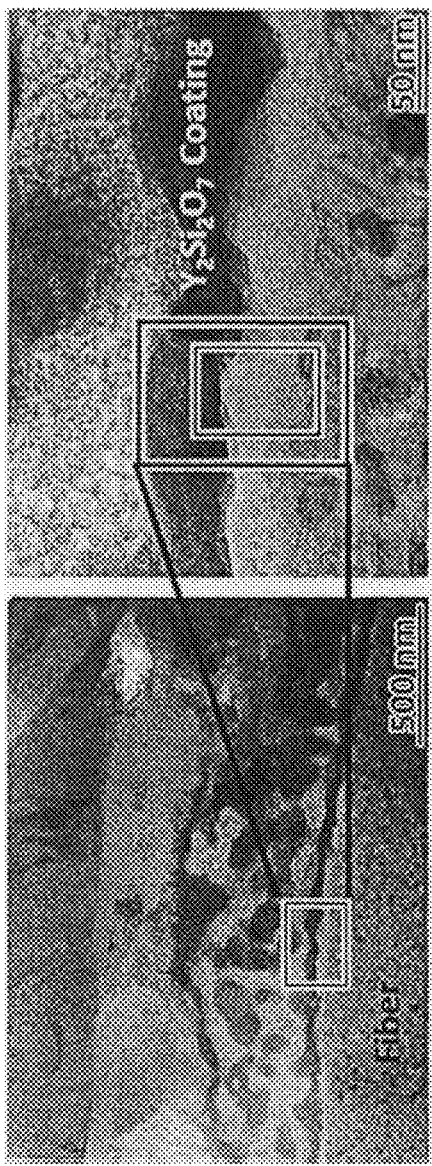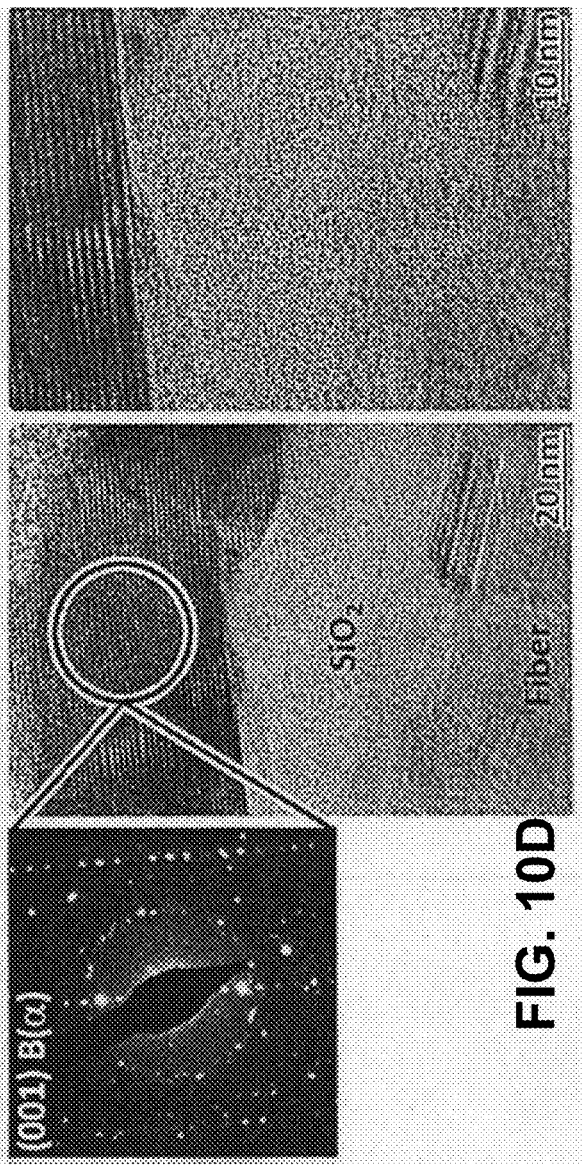
FIG. 10A
FIG. 10B
FIG. 10C
FIG. 10D
FIG. 10E

OXIDATION-RESISTANT FIBER COATINGS AND RELATED METHODS

RIGHTS OF THE GOVERNMENT

The invention described herein may be manufactured and used by or for the Government of the United States for all governmental purposes without the payment of any royalty.

FIELD OF THE INVENTION

The present invention relates generally to composite materials and, more particularly, to improved fiber reinforced ceramic matrix composites.

BACKGROUND OF THE INVENTION

A composite material is a material made from two or more discrete components or phases having significantly different physical or chemical properties. When they are combined, the components of the composite material yield characteristics that are different from the individual components' properties, yet the individual components remain separate and distinct within the finished structure. The new material may include one or more of several desirable features, to include increased strength and toughness, graceful failure, decreased weight, improved environmental stability, reduced cost per unit volume or per unit mass, modified electrical or thermal properties, and the like.

Ceramic materials are of interest for many high temperature applications but are inherently brittle and may fail in a catastrophic manner. Ceramic Matrix Composites (CMCs) are a subset of composite materials that contain a secondary phase (organic or inorganic) dispersed within a ceramic matrix primary phase. In most formulations, the function of the secondary phase is to provide increased strength to the matrix and toughness to the composite. The secondary phase is therefore often referred to as the reinforcing phase. In addition to mechanical functions, the secondary phase may be added to provide thermal and electrical conductivity to an insulating matrix or to improve bioactivity in biocompatible materials.

A known technique to improve the mechanical properties of ceramics includes reinforcement with high strength continuous fibers (often also referred to as "long fiber reinforcement") to form CMCs. In order to realize the full benefits of fiber reinforcement, the matrix must transfer load to the fibers but become decoupled during fracture so that fibers remain intact and continue to bear a load. In many CMCs, the load transfer capabilities between the matrix and the reinforcing fibers may be enhanced through fiber coatings, also referred to as interphases. In coated-fiber-reinforced CMCs, the weak bonding at the matrix/fiber interface provided by the properly engineered coating deflects advancing matrix cracks into the fiber/matrix interface, and thus prevents cracks from propagating into the reinforcing fibers. Thus, cracks develop in the matrix and along the matrix/fiber interfaces, but not in the fibers, which continue to support the load. To partially relieve the growing stress and prevent more cracks developing in the matrix, the fibers will begin to slide out of the cracked matrix, while still bridging the cracks and supporting the load. The addition of reinforcing fibers with fiber coatings provides substantial improvement in the fracture resistance and overall strength as compared to homogeneous ceramics alone. In the state of the art SiC/SiC CMC, boron nitride (BN) and carbon (C) fiber coatings are most commonly used.

While the aforementioned C and BN provide the requisite enhancement of physical properties, they are not oxidation resistant at elevated temperatures and especially in the presence of water vapor. Such oxidation of fiber coatings is a major problem that has limited the widespread use of SiC/SiC composites.

In use, the fiber coating becomes exposed to oxidizing environments when the ends of coated fibers are exposed to a surrounding oxygenated atmosphere. Additionally, when composite stress is above the proportional limit, atmospheric oxygen may reach the fiber coatings through cracks in the matrix.

Oxidation of carbon coatings results in the formation of CO and $CO_2$. This leaves a void between the fiber and the matrix, thus exposing the fiber side and the adjacent matrix to oxidation. This subsequently produces $SiO_2$, which closes the gap between the fiber and the matrix. As a result, the matrix bonds strongly to the fibers, thus causing the composite to lose its damage tolerance. While the BN oxidation rate in dry air or oxygen is slower than the oxidation of carbon, in wet environments the oxidation rate of BN coatings is similar to that of carbon. Depending on temperature, the oxidation of BN results in the loss of BN, and the oxidation product ($B_2O_3$) volatilizes, leaving a gap. Subsequent formation of $SiO_2$ at the interface causes the composite to lose its damage tolerance.

As a result, the oxidation of BN and C fiber coatings leads to the degradation of the strength and toughness of SiC/SiC CMCs with C or BN interfaces after exposure to an oxidizing operating environment and thus restricts the use of current SiC/SiC CMCs.

In addition to the aforementioned limitations, the deposition of fiber coatings, including C and BN coatings, remains a technologically complex and expensive production step. To address this difficulty, some prior art approaches have proposed a novel SiC/SiC composite material, comprising uncoated SiC reinforcing fibers embedded in a multiphase ceramic matrix that consists of an SiC phase and a second phase having low reactivity with respect to SiC and superior oxidation resistance at high temperatures, including, among others, boron nitride (BN) and various rare earth silicates. This approach is not without limitations. Conceptually, it is similar to the porous-matrix concept originally proposed to obtain crack deflection and allow load transfer in oxide/oxide composites with strong fiber/matrix interfaces.

However, the results for porous matrix oxide composites demonstrated significant reductions in damage tolerance and tensile strength as the porosity is reduced. Thus, the damage tolerance, measured as the work of fracture, has decreased rapidly as the matrix porosity decreased: from 3 $kJ/m^2$ at a matrix porosity of 92%, to 1.6 $kJ/m^2$ at a matrix porosity of 88%, and only 0.7 $kJ/m^2$ at a matrix porosity of 80%.

On the other hand, increased matrix porosity or matrix additives, such as, BN or various rare earth silicates is associated with the loss of other essential composite properties, such as interlaminate shear strength, stiffness, and hardness.

Significantly and not coincidentally, the porous matrix concept as applied to SiC/SiC composites has been explored. Similar to the porous matrix oxide composites, matrix porosity of at least 40% was required to achieve damage tolerance in porous matrix SiC/SiC composites. Even then, however, the strength and damage tolerance (as measured by fracture energy) of the composites were only ~50% and 36%, respectively, compared to those of SiC/SiC composites with carbon interface coatings between the fiber and the matrix. This despite the fact that fiber volume fraction was approximately 50-53% for the porous-matrix composites, but only 35-45% for the SiC/SiC composites with carbon interface coatings between the fiber and the matrix.

Given their conceptual similarity, it can be expected that to achieve damage tolerance, the prior art materials would similarly require a significant volume fraction of the second phase having low reactivity with respect to SiC, such as C, BN, or a rare earth silicate second phase. Indeed, the prior art describes a composite produced by infiltration of a slurry mixture containing 65.8 parts of SiC powder by weight and 30 parts by weight of BN powder (BN matrix content of ~40% by volume) into a SiC fiber laminate (Tyranno SA fiber, Ube Industries, Ltd). The volume content of SiC fibers in the CMC so produced was 55%.

The reported proportional limit for the composite material was about 250 MPa and the ultimate tensile strength of about 300 MPa. These numbers are similar to that of the porous-matrix SiC/SiC composites. Therefore, to achieve the required damage tolerance such a material would require the volume content of the second phase in the SiC matrix of at least 40% by volume.

This, in turn, would result in a significant loss of matrix-driven properties, such as interlaminate shear strength and composite stiffness and hardness, among others. Even more crucial, however, is that considering the strength of Tyranno SA fibers (2.4 GPa) and accounting for the fiber volume content of 55%, the tensile strength of the described composite constitutes only 23% of the fiber strength. For comparison, state-of-the-art SiC/SiC composites (HiPer-Comp™) with only 33% volume fraction of BN-coated Hi Nicalon S fibers (nominal strength 3.1 GPa) had tensile strength of over 900 MPa, which, accounting for the volume content of the fibers constitutes nearly 88% of the fiber strength. This means that in addition to the compromised matrix-driven properties, the prior art CMC materials described still significantly underperform in terms of damage tolerance and tensile strength, when compared with the CMCs with state-of-the-art fiber coatings.

The key to understanding this difference in performance is that in a modern SiC/SiC ceramic matrix composite with state-of-the-art fiber coatings, the fiber coating phase constitutes only a relatively small volume fraction of the entire composite, typically ~5-10% of the fiber volume, while providing nearly 100% control of the interface properties and crack deflection at the fiber/matrix interface. This allows this class of CMC materials to have exceptional damage tolerance and tensile strength without compromising the matrix-defined composite properties, such as interlaminate strength and composite stiffness. In contrast, in the CMCs that rely on the second, not load-bearing, matrix phase for crack deflection and damage tolerance, this phase constitutes about 40% of the matrix by volume, while providing only partial control of the fiber/matrix interface properties.

As a result, there still exists an unmet need in the art for oxidation resistant fiber coatings applicable for use in the structural materials for most demanding high temperature applications in oxidizing environments.

SUMMARY OF THE INVENTION

The present invention overcomes the foregoing problems and other shortcomings, drawbacks, and challenges of providing reinforced ceramic composites that are suitable for use in high temperature oxidizing environments. While the invention will be described in connection with certain embodiments, it will be understood that the invention is not limited to these embodiments. To the contrary, this invention includes all alternatives, modifications, and equivalents as may be included within the spirit and scope of the present invention. The term 'about' is intended as within 10% of the stated value, or within +/−10° C.

According to one embodiment of the present invention a method of manufacturing a coated reinforcing fiber for use in Ceramic Matrix Composites, the method comprising pre-oxidizing a plurality of silicon-based fibers selected from the group consisting of silicon carbide (SiC) fibers, silicon nitride ($Si_3N_4$) fibers, SiCO fibers, SiCN fibers, SiCNO fibers, and SiBCN fibers at between 700 to 1300 degrees Celsius in an oxidizing atmosphere to form a silica surface layer on the plurality of silicon-based fibers, forming a plurality of pre-oxidized fibers; applying a rare earth orthophosphate ($REPO_4$) coating to the plurality of pre-oxidized fibers; and heating the plurality of $REPO_4$ coated pre-oxidized fibers at about 1000-1500 degrees Celsius in an inert atmosphere to react the $REPO_4$ with the silica surface layer to form a rare earth silicate or disilicate. The pre-oxidizing step may be between about 0.5 hours to about 100 hours. The heating step may be between about 5 minutes to about 100 hours. Because time and temperature are interdependent, a higher temperature may require less time.

The rare earth orthophosphate ($REPO_4$) is selected from $YPO_4$, $ScPO_4$, $LaPO_4CePO_4$, $PrPO_4$, $NdPO_4$, $PmPO_4$, $SmPO_4$, $EuPO_4$, $GdPO_4$, $TbPO_4$, $DyPO_4$, $HoPO_4$, $ErPO_4$, $TmPO_4$, $YbPO_4$, and $LuPO_4$, or combinations thereof.

According to a first variation of the first embodiment, the step of pre-oxidizing the plurality of fibers is in one or more of atmospheric air, oxygen, water vapor, oxygen plasma, and $CO_2$ gas.

According to another variation, the step of applying a $REPO_4$ coating is performed with one of a solution derived method, CVD, and PVD.

According to a further variation, the plurality of filaments are arranged in bundles of about 500 to about 5000 filaments. In addition, it may be useful to ensure that every filament in a bundle is coated.

According to another variation, the tows comprise a woven cloth or integrally-woven preform. In addition, it may be useful to ensure that every filament in the cloth is coated.

According to a further variation, the $REPO_4$ coating is about 50 nm to 5000 nm thick.

According to a second embodiment of the present invention, a method of manufacturing coated reinforcing fibers for use in Ceramic Matrix Composites comprises applying a silica surface layer onto a plurality of fibers selected from the group consisting of carbon fibers, boron nitride fibers, boron carbide fibers, metal boride fibers, metal carbide fibers, and oxide ceramic fibers, wherein the silica surface layer on the plurality of fibers is formed with one of a solution derived method, CVD, and PVD, forming a plurality of silica-coated fibers; applying a $REPO_4$ coating to the plurality of silica-coated fibers; and heating the plurality of $REPO_4$ coated pre-oxidized fibers having a silica coating at about 1000-1500 degrees Celsius in an inert atmosphere to react the $REPO_4$ with the silica surface layer to form a rare earth silicate or disilicate. The heating step may be between about 5 minutes to about 100 hours. Because time and temperature are interdependent, a higher temperature may require less time.

According to a third embodiment of the invention, a method of manufacturing Ceramic Matrix Composites with an in-situ rare earth silicate-coated reinforcing fiber comprises pre-oxidizing a plurality of fibers, wherein the fibers are selected from the group consisting of silicon carbide (SiC) fibers, silicon nitride ($Si_3N_4$) fibers, SiCO fibers, SiCN fibers, SiCNO fibers, SiBCN fibers; coating the plurality of pre-oxidized fibers with $REPO_4$; forming a fiber tow, or fiber cloth preform with the $REPO_4$ coated fibers; infiltrating the preform with a preceramic precursor (with suitable filler particles, such as SiC, $Si_3N_4$, etc.) to form a Ceramic Matrix Composite; curing and pyrolyzing the ceramic matrix composite (as appropriate for the chosen pre-ceramic precursor; for example, in one embodiment, the composites may be cured at about 250° C. for about 3 hours in vacuum or a flowing Ar or N environment at 1 atm, and pyrolyzed at about 800° C. for about 1 hour in argon or nitrogen with a heating rate of 1° C. to 10° C. per minute); repeating the coating, infiltrating, curing and pyrolyzing steps to increase ceramic matrix composite density; performing a heat treatment of the ceramic matrix composite in an inert environment of nitrogen or argon at about 1000-1500 degrees Celsius for about 5 minutes to about 100 hours to convert the $REPO_4$ coatings on the fibers to rare earth disilicate coatings. Regarding the heat treatment step, this may be the last step of getting a rare earth disilicate coating on the fibers. The heat treatment may be done on the fibers either before they are used in a CMC, or the heat treatment may be deferred to a later stage if heat treatment is a part of the CMC processing. The latter approach may offer the advantage of avoiding duplicate heat treatments. This approach may reduce both the costs and the inevitable loss of fiber strength due to a duplicate heat treatment.

According to a first variation of the third embodiment, the step of pre-oxidizing the plurality of fibers is from about 5 to 100 hours in one or more of atmospheric air, oxygen, water vapor, oxygen plasma, and $CO_2$ gas.

According to a fourth embodiment of the invention, a method of manufacturing Ceramic Matrix Composites with an in-situ rare earth silicate-coated reinforcing fiber, the method comprises applying a silica surface layer onto a plurality of fibers selected from the group consisting of carbon fibers, boron nitride fibers, boron carbide fibers, metal boride fibers, metal carbide fibers, and oxide ceramic fibers, wherein the silica surface layer on the plurality of fibers is formed with one of a solution derived method, CVD, and PVD, forming a plurality of silica coated fibers; coating the plurality of silica coated fibers with $REPO_4$; forming a fiber tow, or fiber cloth preform with the $REPO_4$ coated fibers; infiltrating the preform with a preceramic precursor (with suitable filler particles) to form a Ceramic Matrix Composite; curing and pyrolyzing the ceramic matrix composite (in conditions appropriate for the chosen pre-ceramic precursor, as described above); repeating the coating, infiltrating, curing and pyrolyzing steps to increase ceramic matrix composite density; performing a heat treatment of the ceramic matrix composite in an inert environment of nitrogen or argon to convert the $REPO_4$ coatings on the fibers to rare earth disilicate coatings.

According to a first variation, the heat treatment is performed at about 1000-1500 degrees Celsius for about 5 minutes to about 100 hours.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3A: 1 coat; FIG. 3B: 2 coats. Good control of the resulting $LaPO_4$ coating thickness is demonstrated.

FIGS. 5A-5E present examples of good control over the coating composition. Here SEM micrographs (FIGS. 5A-D) and EDS spectra (FIG. 5E) of $(Gd_{0.4}Dy_{0.6})PO_4$-coated Saphikon™ sapphire fiber are shown. The composition was tailored to take advantage of the xenotime-monazite phase transformation to achieve better coating compliance through transformation plasticity. The reaction to $(Gd,Dy)_3Al_5O_{12}$ garnet at the coating fiber interface is evident in the SEM micrograph FIG. 5C and the EDS spectrum in FIG. 5E.

FIGS. 7A-7D show SEM micrographs of $RE_2Si_2O_7$ coatings on SCS-0 SiC fibers: (FIGS. 7A, 7B) $Y_2Si_2O_7$, 10 coats; (FIGS. 7C, 7D) $Ho_2Si_2O_7$, 20 coats.

FIGS. 9A-9F compare the performance of uncoated fibers with two varieties of coated fibers in accordance with embodiments of the disclosed invention.

FIGS. 10A-10E depict a portion of fiber reinforced SiC minicomposite and the thin silica film between the coated-fiber interface in accordance with embodiments of the disclosed invention.

Figure 1:
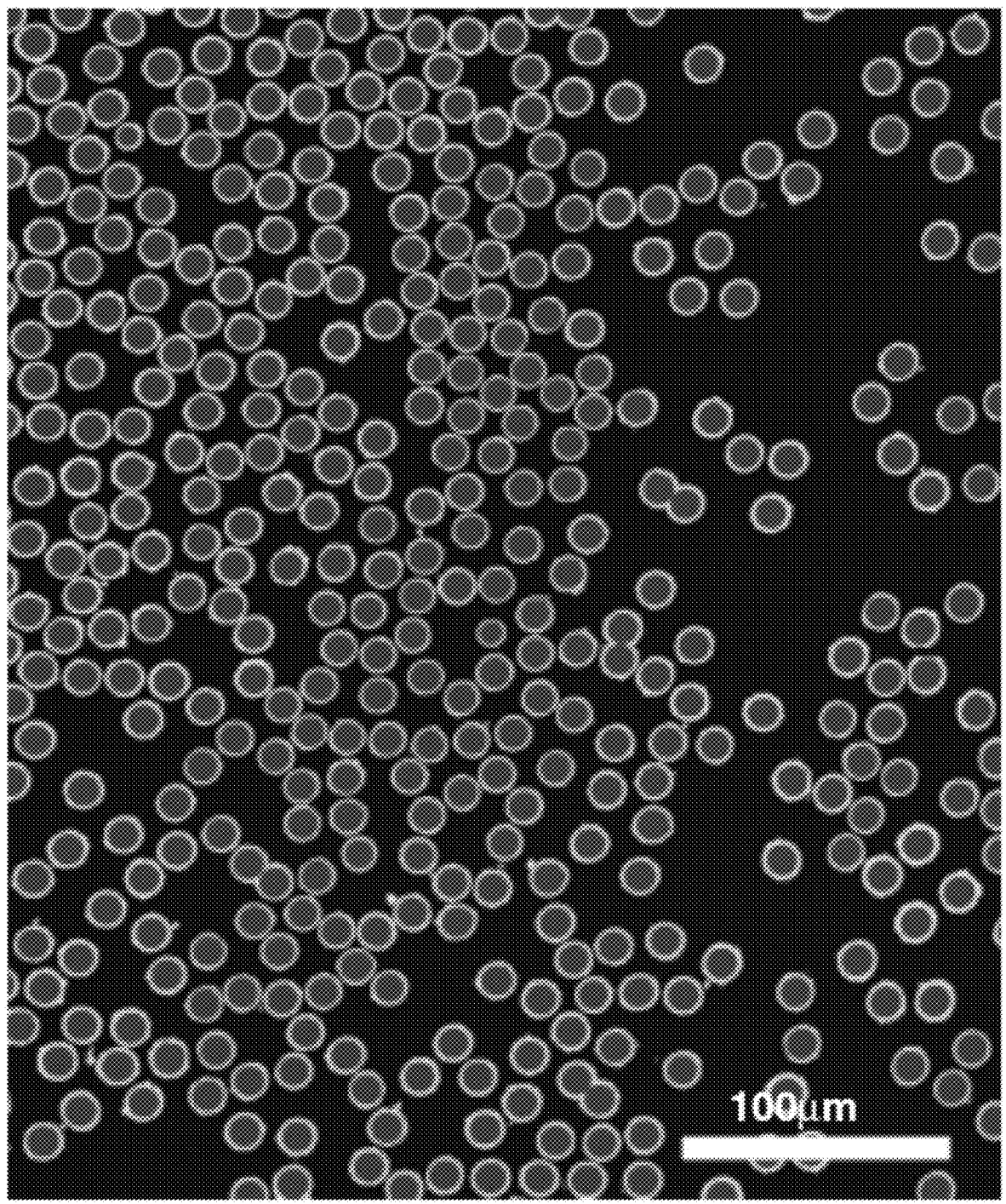
FIG. 1 presents a Scanning Electron Microscope micrograph of coated Nextel 610 (alumina) oxide fiber tows coated 5 times with $LaPO_4$ using solution precursor method.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Ceramic materials are of interest for high temperature applications but are inherently brittle and may fail in a catastrophic manner. A known technique to improve the mechanical properties of ceramics includes reinforcement with high strength fibers to form CMCs. In order to realize the full benefits of fiber reinforcement, the matrix must transfer load to the fibers but become decoupled during fracture so that fibers remain intact and continue to bear a load. In SiC/SiC composites, the load transfer capabilities may be enhanced through boron nitride (BN) and carbon (C) fiber coatings.

Generally, the fiber coating must be chemically and mechanically stable at high temperature in oxygenated environments. The coating must deflect cracks to maintain composite damage tolerance. While the aforementioned C and BN provide the requisite enhancement of physical properties, they are not oxidation resistant. This restricts the use of current SiC/SiC CMCs because they do not have adequate oxidation resistance at elevated temperatures (especially in the presence of water vapor). These limitations result in the degradation of the strength and toughness of SiC/SiC CMCs with C or BN interfaces after being exposed to an oxidizing operating environment.

Such oxidation of fiber coatings is a major problem that has limited the widespread use of SiC/SiC composites. In use, the fiber coating becomes exposed to oxidizing environments when the ends of coated fibers are exposed to the surrounding oxygenated atmosphere. Also, when composite stress is above the proportional limit, the matrix cracks, allowing atmospheric oxygen to reach the fiber coatings. Both C and BN are prone to oxidation. Oxidation of carbon results in the formation of CO and $CO_2$. This leaves a void between the fiber and the matrix, thus exposing the fiber side and the adjacent matrix to oxidation. This subsequently produce $SiO_2$, which closes the gap between the fiber and the matrix. As a result, the matrix bonds strongly to the fibers, thus causing the composite to lose its damage tolerance. While the BN oxidation rate in dry air or oxygen is slower than carbon oxidation, in wet environments the oxidation rate of BN coatings is similar to carbon. Depending on temperature, the oxidation of BN results in the loss of BN, and the oxidation product ($B_2O_3$) volatilizes, leaving a gap. Subsequent formation of $SiO_2$ at the interface causes the composite to lose its damage tolerance.

To overcome these problems, the disclosure that follows will outline embodiments of a rare earth disilicate fiber coating, and related methods, for use with CMCs. The novel coating has been demonstrated to yield beneficial oxidation resistance, as compared to CMCs utilizing uncoated fibers or BN- and C-coated fibers. The addition of the inventive coated fibers yields improved environmental durability of ceramic matrix composites, herein demonstrated on SiC fiber reinforced silicon carbide matrix composites. A new process for obtaining a fiber coating is provided herein. The goal is to have pure disilicate coatings, because they are the most promising as an oxidation-resistant "weak interface" concept and also the most stable with SiC. The method disclosed herein supports the synthesis of disilicates, but monosilicates may result if the method's conditions are not adhered to.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Yttrium disilicate coatings were formed on Hi-Nicalon type S™ fibers (or generally, silicon carbide fibers), using a three stage coating process. 1) Hi-Nicalon type S™ fibers were oxidized at 1000° C. for 0.5 hours to 20 hours in laboratory air to form a thin silica surface layer. 2) $YPO_4$ coatings were then applied to the pre-oxidized Hi-Nicalon type S™ fibers. 3) Coated fibers were heated at about 1200° C. for about 10 hours in argon to react the $YPO_4$ coating with the silica surface layer to form yttrium disilicate. The coatings were characterized by X-ray diffraction, SEM, and TEM.

All Si-based fibers will have their own oxidation kinetics and thermal stability. The objective is to prepare pre-oxidized fibers having a suitable $SiO_2$ thickness while limiting adverse effects on the fiber strength. For some fibers, fiber strength may even be improved slightly after oxidation. Each type of fiber will have its own optimal pre-oxidation regime, which may be established experimentally, but the general principles, including methods of oxidation, remain the same.

In some embodiments of the disclosed invention, certain parameters may be varied to meet design objectives, while still yielding acceptable performance. By way of example and not limitation, in some embodiments, the plurality of silicon carbide fibers may be pre oxidized from about 0.5 hours to about 100 hours in atmospheric air, and the pre-oxidized $YPO_4$ coated fibers may be heated from about 1000° C. to about 1500° C. for about 10 hours to about 20 hours.

In some embodiments of the disclosed invention, the step of pre-oxidizing the plurality of fibers may be conducted in an atmosphere of one or more of oxygen, water vapor, oxygen plasma, and $CO_2$ gas.

In some embodiments of the disclosed invention, a plurality of silicon-based fibers selected from the group consisting of silicon nitride ($Si_3N_4$) fibers, SiCO fibers, SiCN fibers, SiCNO fibers, and SiBCN fibers may be used in place of silicon carbide fibers, using pre-oxidizing and heat treatment parameters within the limits described above.

In some embodiments of the disclosed invention, the fibers may be selected from the group consisting of non-Si based fibers, such carbon fibers, boron nitride fibers, boron carbide fibers, metal boride fibers, metal carbide fibers, or oxide ceramic fibers. These fibers do not contain Si, and unlike Si-based fibers a surface silica layer cannot be formed on them by oxidation. Thus, for these fibers other methods of $SiO_2$ deposition may be used, e.g. a solution derived method, CVD, and PVD, forming a plurality of silica coated ceramic fibers.

In a solution derived method, silica coatings on fibers may be deposited using tetraethoxysilane (TEOS) or other commercially available sol-gel precursors.

Alternatively, silica gel, $[Si(OH)_4]$, may be formed by hydrolysis and polycondensation of tetraethoxysilane (TEOS) in isopropanol or ethanol media with water added in a ratio from 1 to 20 mol $H_2O$ to 1 mol of TEOS and an acid or a base catalyst:

$$Si(OC_2H_5)_4 + 4H_2O \rightarrow Si(OH)_4 + 4C_2H_5OH$$

After hydrolysis, the $Si(OH)_4$ dispersion in isopropanol or ethanol may be used for fiber coatings.

Alternatively, amorphous $SiO_2$ nano-sized particles may be formed by heat treating $Si(OH)_4$:

$$Si(OH)_4 \rightarrow SiO_2 + 2H_2O$$

The $SiO_2$ nanoparticles are then re-dispersed in water or ethanol and used for fiber coating.

In a CVD method, $SiO_2$ films may be deposited using a variety of CVD techniques, such as low temperature CVD, plasma-enhanced CVD (PECVD), medium or low pressure CVD, atmospheric CVD, or photo-induced CVD. Various precursor chemistries for $SiO_2$ deposition have been reported, including tetraethylorthosilicate (TEOS)-$O_2$, TEOS-$O_3$, $SiH_4$—$O_2$, $SiH_4$—$N_2O$, and more.

In a PVD method, pure or doped silica layers can be deposited using planar or rotating cylindrical magnetron by cathode reactive sputtering with either radiofrequency (RF) or direct current (DC) power with pure Si or doped Si targets in Ar/$O_2$ plasma at low (2 µbar) or atmospheric pressure, or SiO target in Ar plasma at the base pressure of $2 \times 10^{-3}$ Pa. The coatings may be applied either at room temperature or elevated temperatures.

In another embodiment of the PVD method, silica layers may be deposited by electron beam evaporation from a SiO source in vacuum or $SiO_2$ source under oxygen pressure of between $10^{-5}$ and $3 \times 10^{-4}$ mbar. Evaporation from SiO source at pressure of $2 \times 10^{-3}$ Pa. by resistive heating may also be used The rare-earth orthophosphate ($REPO_4$) coating may be applied to tows, or bundles of fibers, using a solution-derived method, to include heteroprecipitation. The coating may be used in conjunction with tows ranging from about 500 filaments to about 5000 filaments. Some embodiments may demand complete coverage of all filaments in the tow, while other embodiments will establish a user-selected minimum coverage threshold to achieve performance goals.

For purposes of clarity, a filament is considered equivalent to a fiber. A bundle is a plurality of filaments or fibers. A tow is an untwisted bundle of continuous filaments. Yarn, on the other hand, comprises twisted bundles of filaments, and the filaments may not necessarily be, and most often are not, continuous through the entire length of the yarn bundle.

The $REPO_4$ coating may also be applied to woven cloths. Some embodiments may result in complete coverage of all filaments in the woven cloth, while other embodiments will establish a user-selected minimum coverage threshold to achieve performance goals.

In some embodiments of the disclosed invention, the step of applying an $REPO_4$ coating may be performed with one of a solution derived method, Chemical Vapor Deposition (CVD), or Physical Vapor deposition (PVD).

The solution derived methods include but may not be limited to: (1) using solution precursors; (2) using colloidal hydrated $REPO_4 \cdot H_2O$ sols; and (3) using colloidal $REPO_4$ sols.

In a solution precursor process, the precursors in the solution react to form $REPO_4$ directly on the fiber surface. Examples of solution precursors that form $REPO_4$ are: (a) trimethyl phosphate as the phosphorous source and RE nitrate [$RE(NO_3)_3$] as the rare earth source, and (b) phytic acid as the phosphorous source and $RE(NO_3)_3$ as the RE source.

For colloidal coatings (using colloidal hydrated $REPO_4 \cdot H_2O$ sols or using colloidal $REPO_4$ sols), hydrated $REPO_4 \cdot H_2O$ particles are first formed by precipitating reaction:

$$RE(NO_3)_3 + H_3PO_4 = REPO_4 \cdot H_2O + 3HNO_3$$

The $REPO_4 \cdot H_2O$ particles are dispersed in either water or ethanol and used for fiber coating. Fiber coatings using colloidal hydrated $REPO_4 \cdot H_2O$ particles are converted to $REPO_4$ by heat treating in air at about 600° C. (using colloidal hydrated $REO_4 \cdot H_2O$ sols).

Alternatively, $REPO_4$ nano-sized particles can be formed by heat treating $REPO_4 \cdot H_2O$ particles at about 600° C. The $REPO_4$ particles are then re-dispersed in water or in ethanol and used for fiber coating (using colloidal $REPO_4$ sols).

Turning attention to the Scanning Electron Microscopy (SEM) image in FIG. 1, it shows $LaPO_4$ coated Nextel 610 (alumina) oxide fiber tows coated using solution precursor method. Nearly complete and relatively uniform coverage is achieved.

Figure 2B:
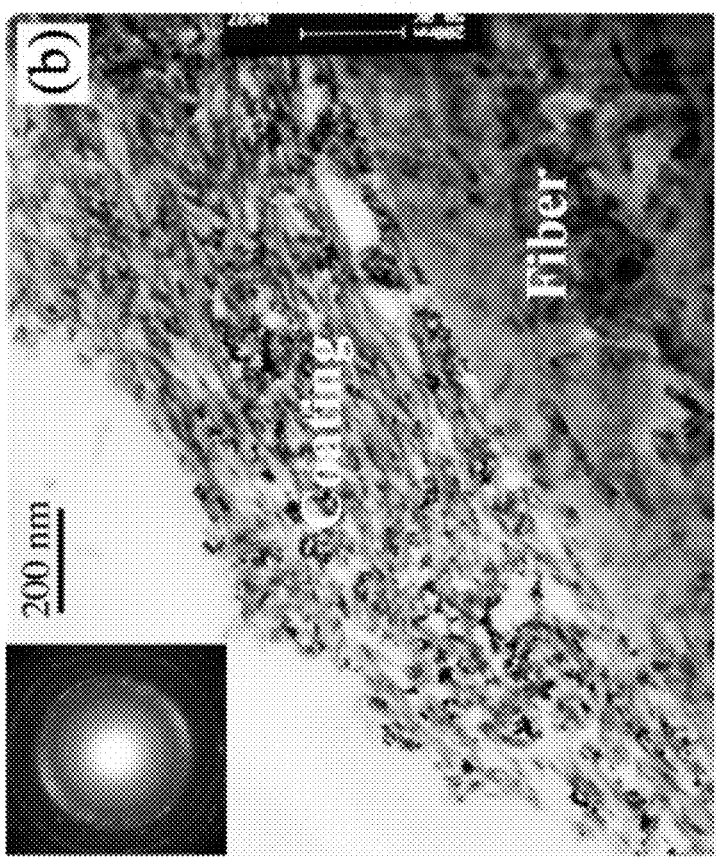
FIGS. 2A-2B present Transmission Electron Microscope (TEM) micrographs of Nextel 720 (alumina-mullite) oxide fibers with $LaPO_4$ (FIG. 2A) and $CePO_4$ (FIG. 2B) coatings produced using the colloidal hydrated $REPO_4 \cdot H_2O$ sol method.
Figure 2A:
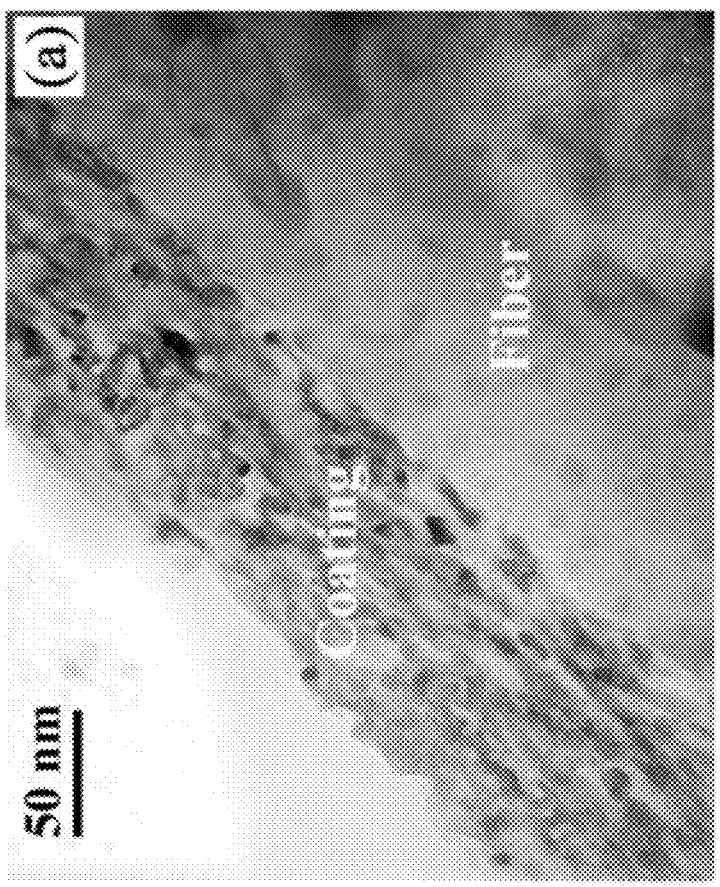

FIG. 2 shows Transmission Electron Microscopy (TEM) images of Nextel 720 (alumina-mullite) oxide fibers with $LaPO_4$ and $CePO_4$ coatings produced using the colloidal hydrated $REPO_4 \cdot H_2O$ sols method.

Figure 3A:
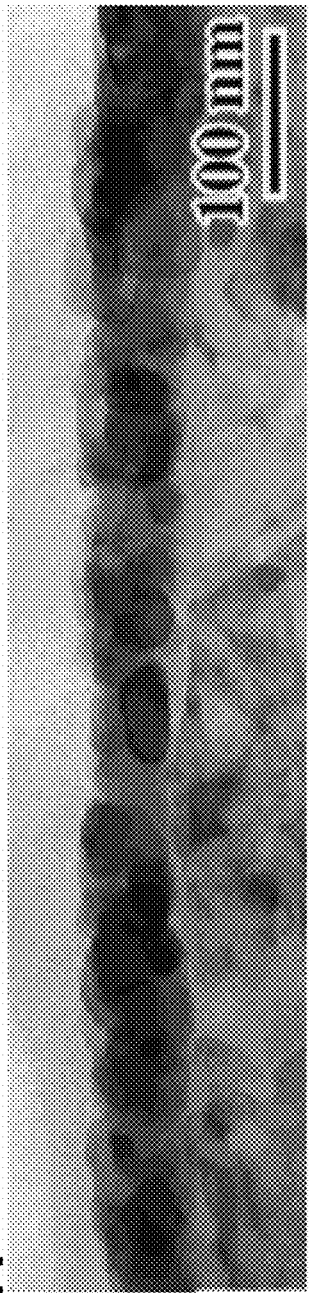
FIGS. 3A-3B present TEM micrographs of Nextel 720 fibers with $LaPO_4$ coatings produced using the colloidal hydrated $LaPO_4 \cdot H_2O$ (rhabdophane) sol method.
Figure 3B:
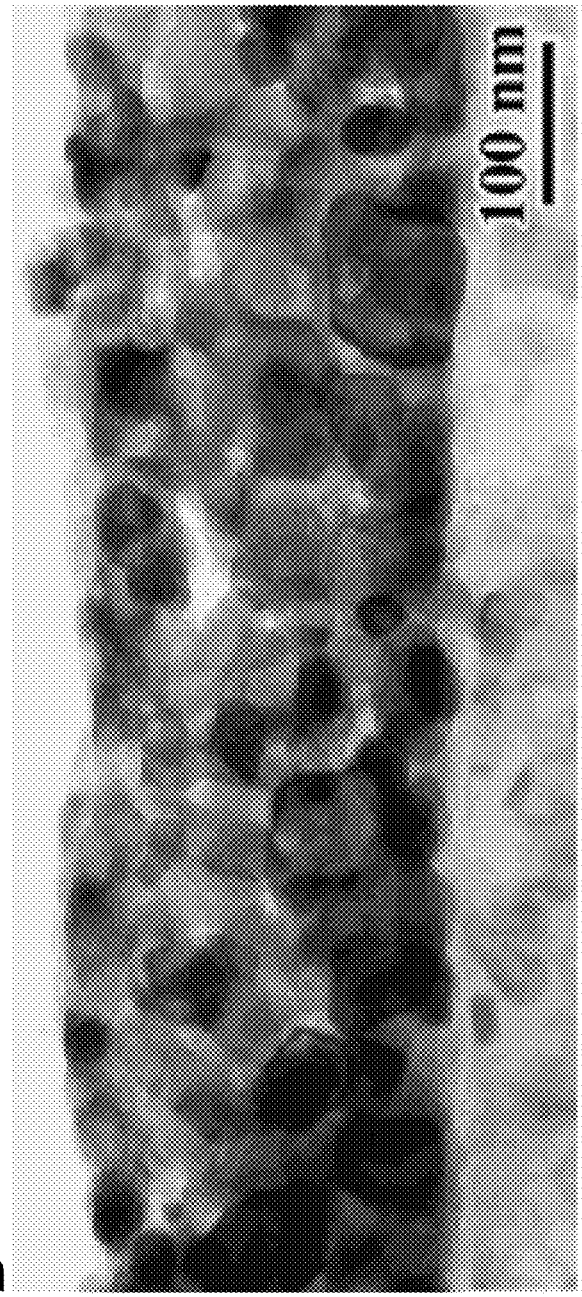

FIG. 3 shows Transmission Electron Microscopy (TEM) images of Nextel 720 fibers with $LaPO_4$ coatings produced using the colloidal hydrated $LaPO_4 \cdot H_2O$ (rhabdophane) sols method. The two images demonstrate that the method allows good control of the resulting $LaPO_4$ coating thickness by varying the number of rhabdophane coats applied.

Figure 4:
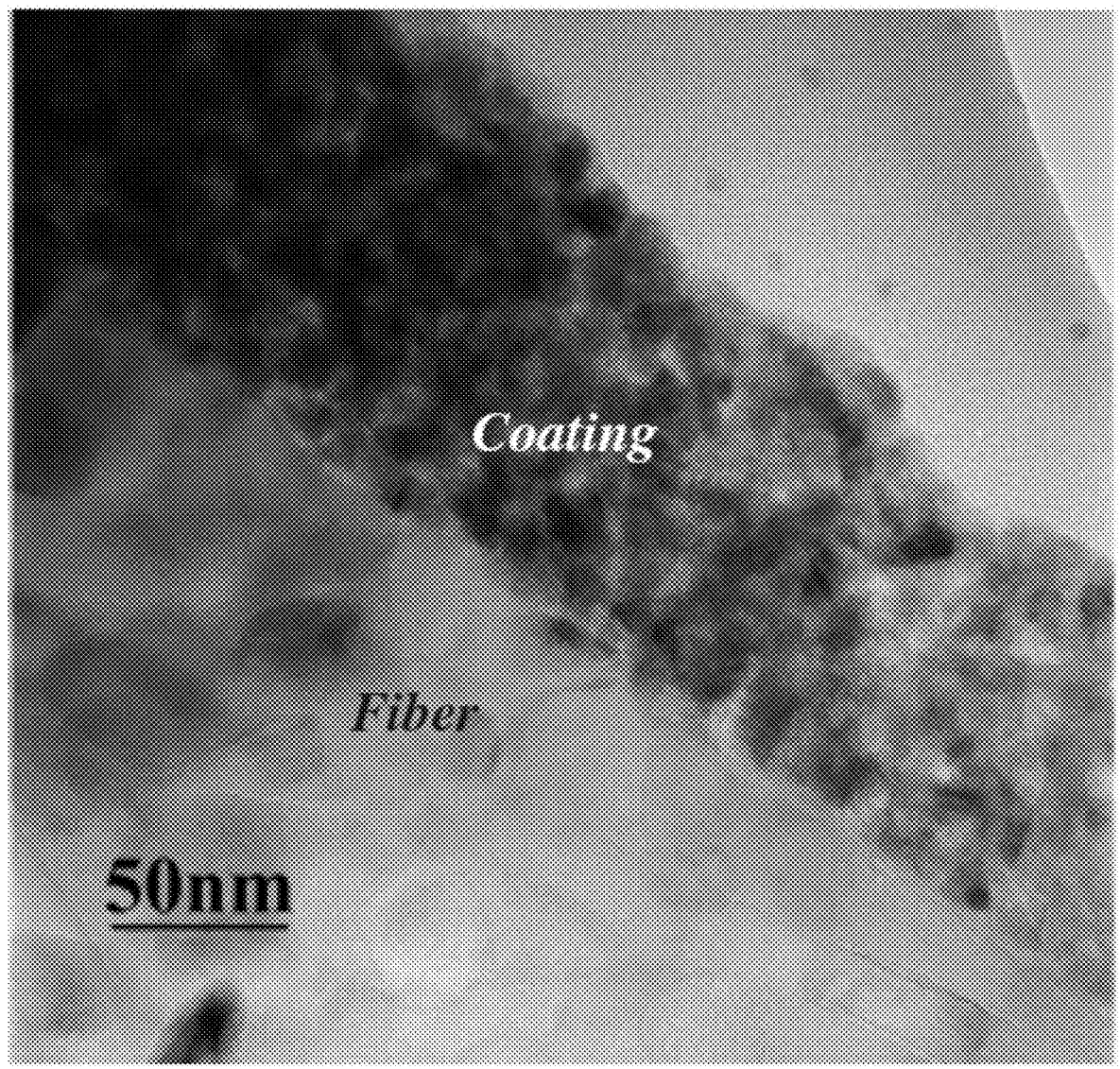
FIG. 4 presents a TEM micrograph of a Nextel 720 fiber with $(Y_{0.7}La_{0.3})PO_4$ coating produced using mixed La—Y colloidal hydrated sols. The flexibility of the process in controlling the chemistry of the resulting $REPO_4$ fiber coatings demonstrated. The composition was tailored to match the coefficient of thermal expansion of the coating to that of the fiber.

Moving on to FIG. 4, it shows a Transmission Electron Microscopy (TEM) image of a Nextel 720 fiber with ($Y_{0.7}$, $La_{0.3}$)$PO_4$ coating produced using mixed La—Y colloidal hydrated sols. The composition was targeted to match the coefficients of thermal expansion (CTE) of the fiber and the coating. This example demonstrates the flexibility of the process in controlling the chemistry of the resulting $REPO_4$ fiber coatings.

FIG. 5 shows Scanning Electron Microscopy (SEM) micrographs and EDS spectra of ($Gd_{0.4}Dy_{0.6}$)$PO_4$-coated Saphikon™ sapphire fiber. Here the composition was tailored to take advantage of the xenotime-monazite phase transformation to achieve better coating compliance through transformation plasticity. The coatings were produced using mixed colloidal hydrated sols. This is another example that demonstrates the flexibility of the process in controlling the chemistry of the resulting $REPO_4$ fiber coatings.

Figure 6A:
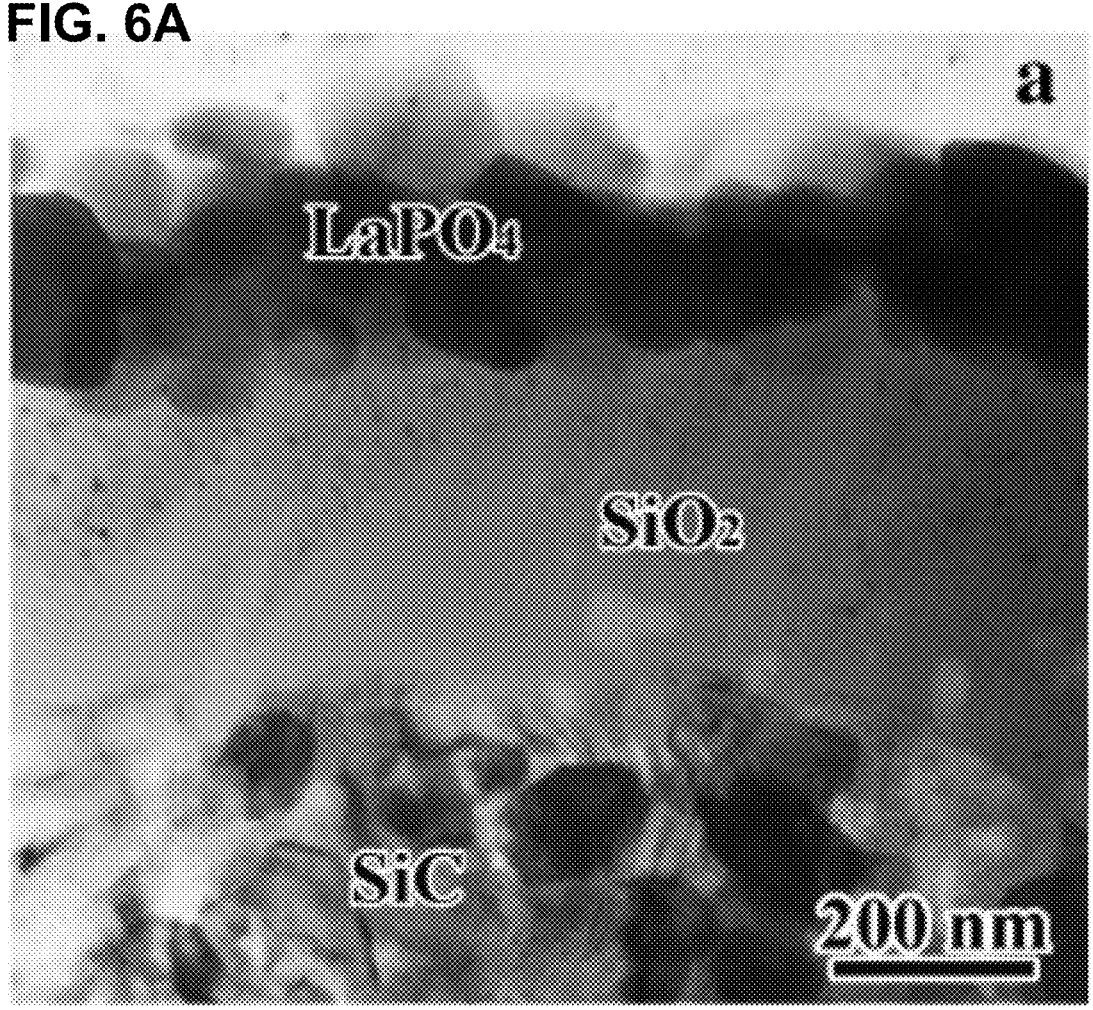
FIGS. 6A-6B are TEM micrographs depicting oxidized Tyranno SA SiC fiber with $LaPO_4$ coating deposited using colloidal hydrated sol method (FIG. 6A) and the transformation of $LaPO_4$ to $La_2Si_2O_7$ after heat treatment in Ar at 1200 C. for 10 h (FIG. 6B).
Figure 6B:
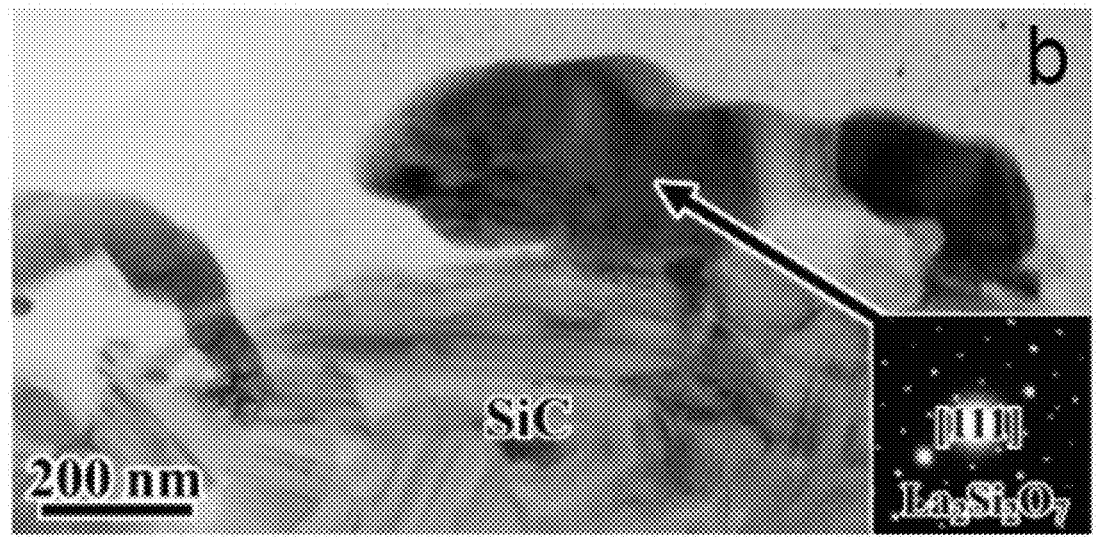

FIG. 6 shows TEM micrographs of oxidized Tyranno SA SiC fiber with $LaPO_4$ coating deposited using colloidal hydrated sol method and the transformation of $LaPO_4$ to $La_2Si_2O_7$ after heat treatment in Ar at 1200 C. for 10 h.

In an Electron Beam Physical Vapor Deposition (EB-PVD) process, the $REPO_4$ coatings may be deposited onto fibers heated to temperatures from about 600° C. to 1100° C. in a vacuum chamber at pressures between $10^{-5}$ and $10^{-4}$ Torr with an electron gun and a $REPO_4$ target prepared by hot-pressing from stoichiometric $REPO_4$ powder produced in a manner described above.

In a Laser Ablation PVD process, the $REPO_4$ coatings may be deposited onto fibers at temperatures from room temperature to about 730° C. using a pulsed laser to evaporate the target material.

Alternatively, $REPO_4$ coatings may be deposited onto the fibers or fiber preform using a Combustion Chemical Vapor Deposition (CCVD) method. As an example of this process, thin $LaPO_4$ coatings were deposited on 3M Nextel 610 fibers using soluble precursors. The precursors dissolved in an organic solvent were nebulized into flowing oxidant (oxygen or air) and combusted in the flame directed at the fibers, forming a crystalline LaPO$_4$ coating. Continuous fiber tows may be coated with the tows continuously fed through the flame. To improve efficiency and uniformity, multiple flames from multiple directions may be used. Different flammable organic solvents, such as xylene, ethanol, and toluene may be used.

The REPO$_4$ coating may be applied with a coating thickness from about 50 nm to about 5000 nm, and the inert atmosphere may comprise an argon or nitrogen atmosphere.

Another method of forming yttrium silicate coatings in-situ during fabrication of SiC/SiC ceramic matrix composites with Y$_2$Si$_2$O$_7$ coated SiC fibers includes infiltrating YPO$_4$ coated fibers with StarFire® SMP-10 SiC precursor or StarFire® SMP-10 SiC precursor loaded with 1 μm SiC particles to form SiC/SiC composites. SiC particles were used as a filler to reduce shrinkage and cracking of the matrix during pyrolysis. The composites were cured at about 250° C. for 3 hours in an Ar or N inert gas environment below 3 atm, e.g. 1 atm, or under vacuum below 0.1 atm, and then pyrolyzed at temperatures above 800° C. for 1 hour in argon with a heating rate of 1° C. to 10° C. per minute such that the pre-ceramic polymer is converted from a polymer state to an amorphous ceramic. The process of infiltration and pyrolysis may be repeated one to five times to improve the composite density. Composites were given a final heat treatment in argon at about 1200° C. for a total time of about 10 hours to densify the matrix and to convert the YPO$_4$ coatings to yttrium silicate.

In further embodiments of the disclosed invention, certain parameters may be varied to meet design objections, while still yielding acceptable performance. By way of example and not limitation, in some embodiments, composites may be cured at from about 150° C. to about 400° C. for a period ranging from about 5 min to about 5 hours.

Likewise, the composites may be pyrolyzed at a temperature from about 400° C. to about 1500° C. for a period ranging from about 0.5 hour to about 10 hours. Re-pyrolyzing may be performed between temperatures from about 800° C. to about 1500° C. for a period from about 0.5 hour to about 10 hours.

Final heat treatment of the composites may be performed at a temperature ranging from about 1000° C. to about 1500° C. for a period between about 5 hours to about 15 hours to densify the matrix and to convert the YPO$_4$ coatings to yttrium silicate.

The ceramic precursor may include SiC or other ceramic particles that are inert with respect to the preceramic polymer precursor. Preceramic polymers may be loaded with up to 55 vol % of the inert ceramic particles, with the preferred embodiment being between 10 vol. % and 35 vol %. The particles may have a mean diameter from about 0.1 μm to about 10 μm, while some embodiments may use particles having a mean diameter of about 1 μm. In other embodiments, a mixture of particles with bimodal or more complex particle size distributions may be used, which may allow a higher total solids loading of the precursor. The inert environment may include an argon or nitrogen inert atmosphere.

Composites with no coatings were made and used as a control for comparison, and each of the composites was tested for tensile strength. Although the average tensile strength of coated fibers pre-oxidized for about 20 hours and about 0.5 hours and heat treated at about 1200° C. for about 10 hours in argon was reduced by 10% and 30% respectively (Table 1), the average tensile strengths of the composites made from the coated fibers were 2 to 3 times stronger than composites formed with uncoated fibers (Table 2). The following tables provide details with respect to the observed performance.

TABLE 1

Tensile strength (GPa) of Hi-Nicalon type S ™ fibers heat treated in argon at 1200° C. for 10 hours:

|  | Preoxidized - 20 h | Preoxidized - 0.5 h |
| --- | --- | --- |
| Control (no coating) | 2.6 ± 0.24 | 2.8 ± 0.25 |
| YPO$_4$ Coating | 2.5 ± 0.17 | 2.0 ± 0.23 |

TABLE 2

Tensile strength (MPa) of Hi-Nicalon type S ™ reinforced SiC composites with and without yttrium silicate interface coatings:

| Control (no coating) | Preoxidized - 20 h | Preoxidized - 0.5 h |
| --- | --- | --- |
| 200 ± 80 | 380 ± 70 | 500 ± 110 |

FIGS. 7A-7D show scanning electron micrographs of RE$_2$Si$_2$O$_7$ coatings deposited on SCS-0 SiC fibers using the method described in the present invention. These micrographs demonstrate the flexibility of the method in controlling both the chemistry and the thickness of the RE$_2$Si$_2$O$_7$ coatings by selecting the appropriate precursors and varying the number of coats applied: Y$_2$Si$_2$O$_7$, 10 coats (FIGS. 7A-7B) and Ho$_2$Si$_2$O$_7$, 20 coats (FIGS. 7C-7D).

Figure 8A:
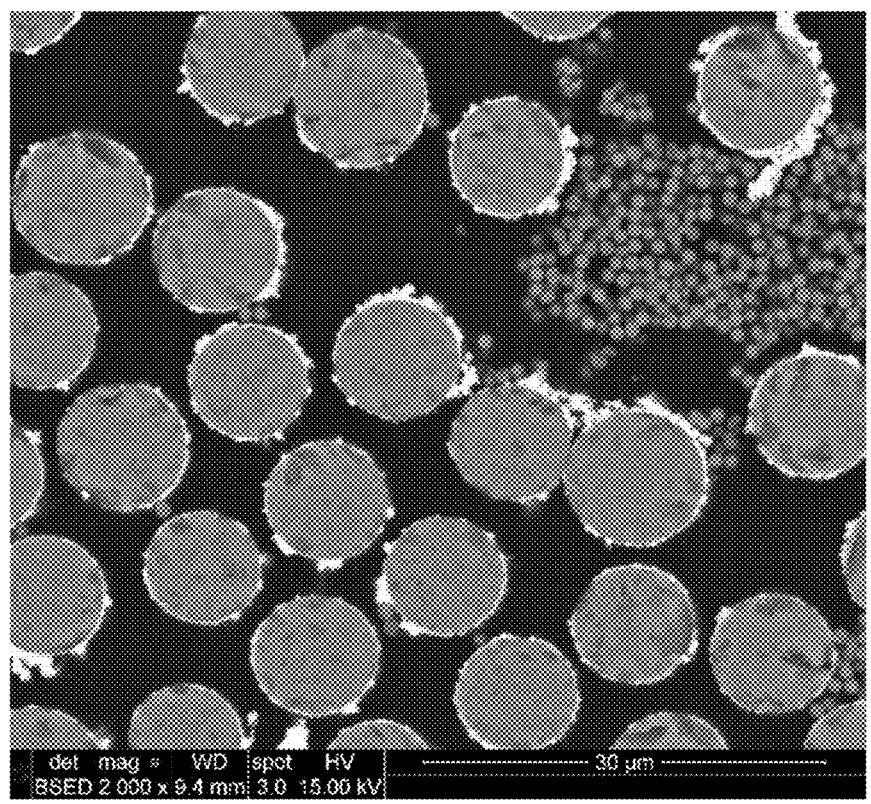
FIGS. 8A-8B show SEM micrograph of silica fibers coated with $YPO_4$ (6 coats) using the solution precursor method (FIG. 8A) and the x-ray diffraction spectrum demonstrating the conversion of $YPO_4$ coating to $Y_2Si_2O_7$ after heat treatment in argon at 1200° C. for 20 h (FIG. 8B).
Figure 8B:
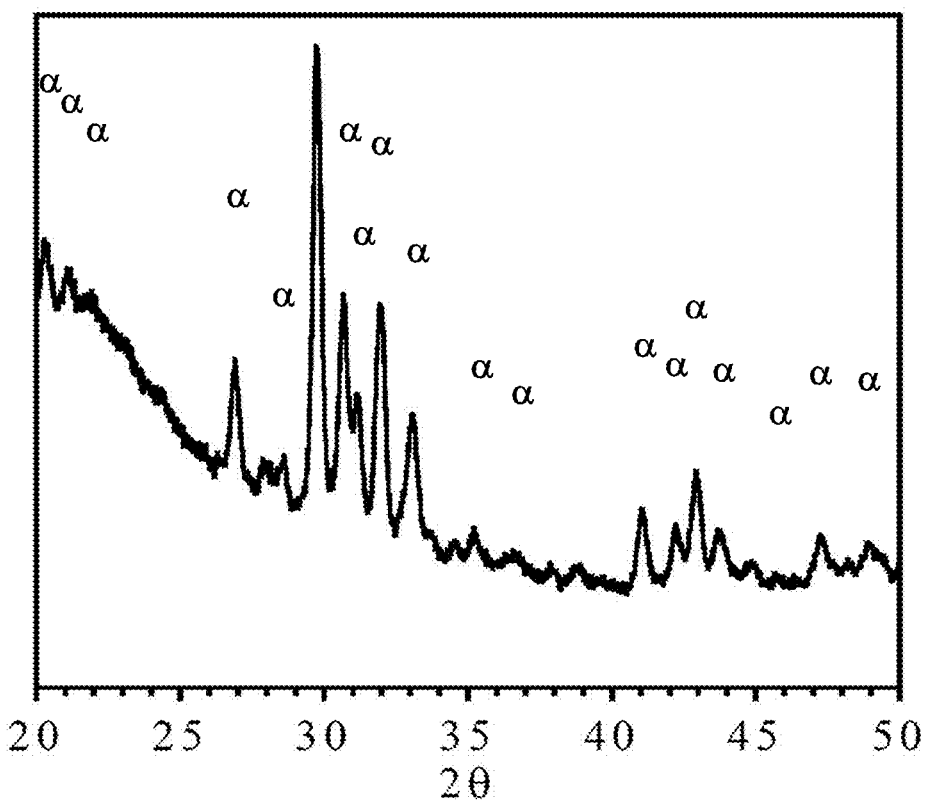

FIGS. 8A-8B show scanning electron micrograph (FIG. 8A) of silica fibers coated with YPO$_4$ (6 coats) using the solution precursor method and the x-ray diffraction spectrum (FIG. 8B) demonstrating the conversion of YPO$_4$ coating to Y$_2$Si$_2$O$_7$ after heat treatment in argon at 1200° C. for 20 h.

Turning attention to FIGS. 9A-9F, SEM fractography showed no crack deflection and no fiber pullout for the composites without coatings (FIGS. 9A-9B). Crack deflection at the fiber coating interface was observed for composites containing yttrium silicate coatings (FIGS. 9C-9F).

TEM characterization confirmed the presence of α-Y$_2$Si$_2$O$_7$ at the fiber-matrix interface depicted in FIGS. 10A-10E.

Figure 11:
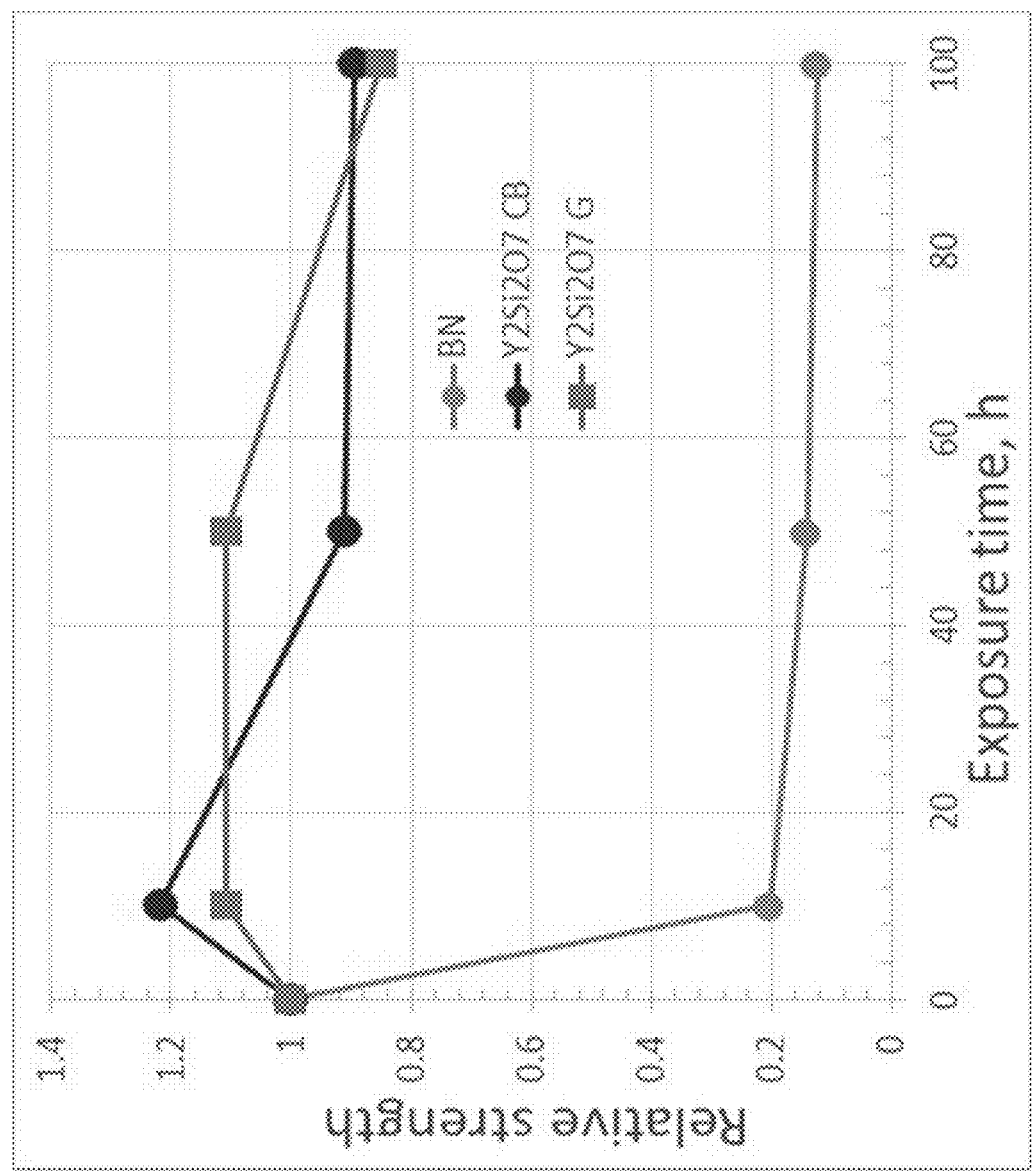
FIG. 11 presents normalized tensile strength of SiC/SiC composites with BN (BN) and $Y_2Si_2O_7$ interface ($Y_2Si_2O_7$) after oxidation in steam at 1000° C.

SiC/SiC composites with BN and Y$_2$Si$_2$O$_7$ fiber coatings were exposed to steam at 1000° C. for 10, 50, and 100 h and their tensile strengths were measured and compared. FIG. 11 presents normalized tensile strengths (composite strength after exposure to steam normalized to the as-fabricated strength) of SiC/SiC composites with BN (BN) and Y$_2$Si$_2$O$_7$ interface (Y$_2$Si$_2$O$_7$—CB and Y$_2$Si$_2$O$_7$-G) after oxidation in steam at 1000° C. For SiC/SiC composites with Y$_2$Si$_2$O$_7$ interphase, the relative strength increased by 10-20% after 10 h exposure. At longer exposures of 50 to 100 hours the relative strength decreased gradually, but the composites still retained ~90% of their original strength after 100 h exposure. In contrast, the composites with BN interphase experienced a severe drop of strength already after 10 h exposure to steam. Furthermore, the mini-composites with BN interphase retained only ~20% of their initial as-fabricated strength after 10 h exposure and 10% after exposure for 50 and 100 h.

While the experimental results, above, are directed to particular examples of oxidation resistant fiber coatings, it is noted that embodiments of the disclosed invention are applicable to all rare earth disilicates and monosilicates. Alternative embodiment examples include disilicates and monosilicates of other rare earth orthophosphates, e.g. scandium, yttrium, lutetium, ytterbium, terbium, erbium, holmium, dysprosium, gadolinium, and europium, or combinations thereof.

In some embodiments of the disclosed invention, the $REPO_4$ coating may have. an applied thickness from about 50 nm to about 1000 nm. To facilitate complete conversion of $REPO_4$ to $RE_2Si_2O_7$, the ratio of the $REPO_4$ coating thickness to the thickness of the underlying silica layer on the fiber surface should not exceed ~0.9. Preferably, a 25 to 100 nm silica layer should remain on the fiber surface after complete conversion of $REPO_4$ to $RE_2Si_2O_7$. The ratio of the final $RE_2Si_2O_7$ coating thickness to the fiber diameter may be from about 0.005 to about 0.5. The $RE_2Si_2O_7$ interface coating will have a thickness exceeding the surface roughness amplitude of the fiber by a factor of 2-10 to facilitate fiber pull-out.

The optimal thickness of the actual interface coating (e.g. $RE_2Si_2O_7$, BN, C, etc.) will depend on a number of parameters, including the fiber surface roughness, coating compliance, elastic properties and thermal conductivity of the CMC constituents, thermal expansion mismatch, fiber strength, etc. The optimal coating thickness is also a function of coating thickness uniformity, which is typically much better for CVD methods than for solution-derived methods, and thus may be process-dependent. In addition, it may be application dependent. Beyond that, the coating thickness needs to be kept to a minimum. A large volume fraction of the coating in the composite may negatively affect other essential composite properties, such as modulus, interlaminar shear strength, thermal conductivity, thermal expansion, etc.

Improved environmental stability and structural properties resulting from the claimed and disclosed invention are particularly suited for use in turbine and scram jet engine components, other hot-section components and exhaust section components for high performance military aircraft, thermal protection systems on hypersonic vehicles, high efficiency low emission land based power-generation turbines, radiant burners, and high temperature filters in power plants or hazardous waste disposal facilities.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of manufacturing a coated reinforcing fiber for use in Ceramic Matrix Composites, the method comprising:
   pre-oxidizing a plurality of silicon-based fibers selected from the group consisting of SiCO fibers, SiCN fibers, SiCNO fibers, and SiBCN fibers at between 700 to 1300 degrees Celsius from between about in an oxidizing atmosphere to form a silica surface layer on the plurality of silicon-based fibers, forming a plurality of pre-oxidized fibers;
   applying a rare earth orthophosphate ($REPO_4$) coating to the plurality of pre-oxidized fibers; and
   heating the plurality of $REPO_4$ coated pre-oxidized fibers at about 1000-1500 degrees Celsius in an inert atmosphere to react the $REPO_4$ with the silica surface layer to form a rare earth silicate, wherein the rare earth orthophosphate ($REPO_4$) is selected from the group consisting of $YPO_4$, $ScPO_4$, $CePO_4$, $PrPO_4$, $NdPO_4$, $PmPO_4$, $SmPO_4$, $EuPO_4$, $GdPO_4$, $TbPO_4$, $DyPO_4$, $HoPO_4$, $ErPO_4$, $TmPO_4$, $YbPO_4$, and $LuPO_4$, or combinations thereof.

2. The method of claim 1, wherein the step of pre-oxidizing the plurality of fibers is from about 5 to 100 hours in one or more of atmospheric air, oxygen, water vapor, oxygen plasma, and $CO_2$ gas.

3. The method of claim 1, wherein the step of applying a $REPO_4$ coating is performed with one of a solution derived method, CVD, and PVD.

4. The method of claim 1, wherein a plurality of filaments is arranged in bundles of about 500 to about 5000 filaments.

5. The method of claim 4, wherein the bundles comprise a woven cloth or integrally woven preform.

6. The method of claim 1, wherein the $REPO_4$ coating is about 50 nm to 5000 nm thick.

7. A method of manufacturing Ceramic Matrix Composites with an in-situ rare earth silicate-coated reinforcing fiber, the method comprising:
   pre-oxidizing a plurality of fibers, wherein the fibers are selected from the group consisting of SiCO fibers, SiCN fibers, SiCNO fibers, SiBCN fibers;
   coating the plurality of pre-oxidized fibers with a rare earth orthophosphate ($REPO_4$), wherein the rare earth orthophosphate ($REPO_4$) is selected from the group consisting of $YPO_4$, $ScPO_4$, $CePO_4$, $PrPO_4$, $NdPO_4$, $PmPO_4$, $SmPO_4$, $EuPO_4$, $GdPO_4$, $TbPO_4$, $DyPO_4$, $HoPO_4$, $ErPO_4$, $TmPO_4$, $YbPO_4$, and $LuPO_4$, or combinations thereof;
   forming a fiber tow, or fiber cloth preform with the $REPO_4$ coated fibers;
   infiltrating the preform with a preceramic precursor with filler particles to form a Ceramic Matrix Composite;
   curing and pyrolyzing the ceramic matrix composite;
   repeating the coating, infiltrating, curing and pyrolyzing steps to increase ceramic matrix composite density;
   performing a heat treatment of the ceramic matrix composite in an inert environment of nitrogen or argon at about 1000-1500 degrees Celsius for about 5 minutes to about 100 hours to convert the $REPO_4$ coatings on the fibers to rare earth disilicate coatings.

8. The method of claim 7, wherein the step of pre-oxidizing the plurality of fibers is from about 5 to 100 hours in one or more of atmospheric air, oxygen, water vapor, oxygen plasma, and $CO_2$ gas.

* * * * *